(12) United States Patent
Alvarez-Icaza et al.

(10) Patent No.: US 9,984,324 B2
(45) Date of Patent: May 29, 2018

(54) DUAL DETERMINISTIC AND STOCHASTIC NEUROSYNAPTIC CORE CIRCUIT

(71) Applicant: International Business Machines Corporation, Armonk, NY (US)

(72) Inventors: Rodrigo Alvarez-Icaza, Mountain View, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/353,675

(22) Filed: Nov. 16, 2016

(65) Prior Publication Data

US 2017/0068885 A1 Mar. 9, 2017

Related U.S. Application Data

(63) Continuation of application No. 13/957,805, filed on Aug. 2, 2013, now Pat. No. 9,558,443.

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01); *G06N 3/0472* (2013.01)

(58) Field of Classification Search
None
See application file for complete search history.

(56) References Cited

U.S. PATENT DOCUMENTS

| 4,686,989 A | 8/1987 | Smyth et al. |
| 4,893,255 A | 1/1990 | Tomlinson, Jr. |
| 4,965,800 A | 10/1990 | Farnbach |
| 5,083,285 A | 1/1992 | Shima et al. |

(Continued)

FOREIGN PATENT DOCUMENTS

EP 10569764 A2 11/1993

OTHER PUBLICATIONS

Arthur, J.V. et al., "Learning in Silicon: Timing is Everything", Advances in Neural Information Processing Systems 18, 2006, pp. 1-8, MIT Press, United States.

(Continued)

*Primary Examiner* — Christyann Pulliam
*Assistant Examiner* — Kevin W Figueroa
(74) *Attorney, Agent, or Firm* — Sherman IP LLP; Kenneth L. Sherman; Hemavathy Perumal

(57) ABSTRACT

One embodiment provides a system comprising a memory device for maintaining deterministic neural data relating to a digital neuron and a logic circuit for deterministic neural computation and stochastic neural computation. Deterministic neural computation comprises processing a neuronal state of the neuron based on the deterministic neural data maintained. Stochastic neural computation comprises generating stochastic neural data relating to the neuron and processing the neuronal state of the neuron based on the stochastic neural data generated.

14 Claims, 14 Drawing Sheets

(56) References Cited

U.S. PATENT DOCUMENTS

| | | | |
|---|---|---|---|
| 5,091,872 | A | 2/1992 | Agrawal |
| 5,155,802 | A | 10/1992 | Mueller et al. |
| 5,336,937 | A | 8/1994 | Sridhar et al. |
| 5,381,515 | A | 1/1995 | Platt et al. |
| 5,404,556 | A | 4/1995 | Mahowald et al. |
| 6,269,351 | B1* | 7/2001 | Black ............... G06N 3/082 706/12 |
| 6,557,070 | B1 | 4/2003 | Noel, Jr. |
| 6,710,623 | B1 | 3/2004 | Jones et al. |
| 7,259,587 | B1 | 8/2007 | Schmit et al. |
| 7,392,230 | B2 | 6/2008 | Nugent |
| 7,426,501 | B2 | 9/2008 | Nugent |
| 7,457,787 | B1 | 11/2008 | Furber |
| 7,502,769 | B2 | 3/2009 | Nugent |
| 7,512,572 | B2 | 3/2009 | Furber |
| 7,599,895 | B2 | 10/2009 | Nugent |
| 7,657,313 | B2 | 2/2010 | Rom |
| 7,818,273 | B2 | 10/2010 | Ananthanarayanan et al. |
| 7,877,342 | B2 | 1/2011 | Buscema |
| 7,978,510 | B2 | 7/2011 | Modha et al. |
| 8,250,010 | B2 | 8/2012 | Modha et al. |
| 8,447,407 | B2 | 5/2013 | Talathi et al. |
| 8,447,714 | B2 | 5/2013 | Breitwisch et al. |
| 8,473,439 | B2 | 6/2013 | Arthur et al. |
| 8,510,239 | B2 | 8/2013 | Modha |
| 8,515,885 | B2 | 8/2013 | Modha |
| 8,527,438 | B2 | 9/2013 | Jackson et al. |
| 8,606,732 | B2 | 12/2013 | Venkatraman et al. |
| 8,909,576 | B2 | 12/2014 | Akopyan et al. |
| 2008/0275832 | A1 | 11/2008 | McDaid et al. |
| 2009/0292661 | A1 | 11/2009 | Haas |
| 2009/0313195 | A1 | 12/2009 | McDaid et al. |
| 2011/0153533 | A1 | 6/2011 | Jackson et al. |
| 2012/0084240 | A1 | 4/2012 | Esser et al. |
| 2012/0084241 | A1 | 4/2012 | Friedman et al. |
| 2012/0109863 | A1 | 5/2012 | Esser et al. |
| 2012/0173471 | A1 | 7/2012 | Ananthanarayanan et al. |
| 2012/0259804 | A1 | 10/2012 | Brezzo et al. |
| 2012/0290347 | A1* | 11/2012 | Elazouni .......... G06Q 10/06313 705/7.12 |
| 2013/0031040 | A1 | 1/2013 | Modha |
| 2013/0151450 | A1* | 6/2013 | Ponulak ............ G06N 3/049 706/25 |
| 2013/0226851 | A1 | 8/2013 | Hunzinger et al. |
| 2013/0325765 | A1 | 12/2013 | Hunzinger |
| 2013/0325767 | A1 | 12/2013 | Hunzinger |
| 2013/0325774 | A1 | 12/2013 | Sinyavskiy |
| 2014/0032460 | A1 | 1/2014 | Cruz-Albrecht et al. |
| 2014/0074761 | A1 | 3/2014 | Hunzinger |
| 2014/0114893 | A1 | 4/2014 | Arthur et al. |
| 2014/0277718 | A1 | 9/2014 | Izhikevich |
| 2015/0262055 | A1 | 9/2015 | Akopyan |
| 2016/0224886 | A1 | 8/2016 | Akopyan |

OTHER PUBLICATIONS

Boahen, K.A., "A Burst-Mode Word-Serial Address-Event Link--I: Transmitter Design", IEEE Transactions on Circuits and Systems—I: Regular Papers, Jul. 2004, pp. 1269-1280, vol. 51, No. 7, IEEE, United States.

Karmarkar, U.R. et al., "Mechanisms and significance of spike-timing dependent plasticity", Biological Cybernetics, Jan. 28, 2002, pp. 373-382, vol. 87, No. 5-6, Springer-Verlag, Germany.

Martin, A.J. "Asynchronous Datapaths and the Design of an Asynchronous Adder", Formal Methods in System Design, 1992, pp. 1-24, vol. 1:1, Kluwer, United States.

Rast, A.D., et al., "Virtual Synaptic Interconnect Using an Asynchronous Network-on-Chip", Proceedings of the 2008 International Joint Conference on Neural Networks (IJCNN 2008), Jun. 1-8, 2008, pp. 2727-2734, IEEE, United States.

Arbib, M.A., "The Handbook of Brain Theory and Neural Networks" Massachusetts Institute of Technology, pp. 1-650, 2nd Edition, United States.

Arbib, M.A., "The Handbook of Brain Theory and Neural Networks" Massachusetts Institue of Technology, pp. 651-1301, 2nd Edition, United States.

Linares-Barranco, B. et al., "Exploiting Memristance for Implementing Spike-Time-Dependent-Plasticity in Neuromorphic Nanotechnology Systems", Proceedings of the 2009 IEEE Conference on Nanotechnology (IEEE-NANO 2009), Jul. 26-30, 2009, pp. 601-604, IEEE, United States.

Boahen, K.A., "Point-to-Point Connectivity Between Neuromorphic Chips Using Address Events," IEEE Transactions on Circuits and Systems—II: Analog and Digital Signal Processing, May 2000, pp. 416-434, vol. 47, No. 5, IEEE, United States.

Lazzaro, J. et al., "Silicon auditory processors as computer peripherals," IEEE Transactions on Neural Networks, May 1993, pp. 523-528, vol. 4, No. 3, IEEE, United States.

Merolla, P.A. et al., "Expandable Networks for Neuromorphic Chips," IEEE Transactions on Circuits and Systems—I: Regular Papers, Feb. 2007, pp. 301-311, vol. 54, No. 2, IEEE, United States.

Mezard, M. et al., "Learning in feedforward layered networks: the tiling algorithm," Journal of Physics A: Mathematical and General, 1989, pp. 2191-2203, vol. 22, No. 12, IOP Publishing Ltd., United Kingdom.

Patel, G.N. et al., "An Asynchronous Architecture for modeling Intersegmental Neural Communication," IEEE Transactions on Very Large Scale Integration (VLSI) Systems, Feb. 2006, pp. 97-110,vol. 14, No. 2, IEEE, United States.

Garrido, J.A. et al., "Event and Time Driven Hybrid Simulation of Spiking Neural Networks," Proceedings of the 2011 International Work-Conference on Artificial Neural Networks (IWANN 2011), Jun. 8-10, 2011, pp. 554-561, Vo. 6691, Spain.

Rochel, O. et al., "An event-driven framework for the simulation of networks of spiking neurons," Proceedings of the 2003 European Symposium on Artificial Neural Networks Bruges (ESANN'2003), Apr. 23-25, 2003, pp. 295-300, Beglium.

Marian, I. et al., "Efficient event-driven simulation of spiking neural networks," Proceedings of the 2002 3rd WSEAS International Conference on Neural Networks and Applications, 2002, pp. 1-7, Ireland.

Yudanov, D. et al., "GPU-Based Simulation of Spiking Neural Networks with Real-Time Performance & High Accuracy," Proceedings of the WCCI 2010 IEEE World Congress on Computational Intelligence, Jul. 18-23, 2010, pp. 2143-2150, United States.

Boucheny, C. et al., "Real-Time Spiking Neural Network: An Adaptive Cerebellar Model," Proceedings of the 2005 8th International Work-Conference on Artificial Neural Networks (IWANN 2005), Jun. 8-10, 2005, pp. 136-144, United States.

Makino, T. et al., "A Discrete-Event Neural Network Simulator for General Neuron Models," Proceedings of the 2003 Neural Computing & Applications, Jun. 2003, pp. 210-223, vol. 11, Issue 3-4, United States.

Brette, R. et al., "Simulation of networks of spiking neurons: A review of tools and strategies," J Comput Neurosci Dec. 23, 2007, pp. 349-398, United States.

Lin, J. et al., "A Delay-Insensitive, Address-Event Link", Proceedings of the 2009 15th IEEE Symposium on Asynchronous Circuits and Systems (ASYNC'09), May 17-20, 2009, pp. 55-62, United States.

Boahen, K.A., "Point-to-Point Connectivity Between Neuromorphic Chips Using Address Events," IEEE Transactions on Circuits and Systems—II: Analog and Digital Signal Processing, 1999, pp. 100- 117,vol. XX, No. Y, Stanford University, United States [downloaded: http://www.stanford.edu/group/brainsinsilicon/pdf/00_journ_IEEEtsc_Point.pdf].

Djureldt, M., "Large-scale Simulation of Neuronal Systems", KTH School of Computer Science and Communication, Doctoral Thesis, Apr. 2009, pp. 1-200, Stockholm, Sweden.

Leibold, C., et al., "Mapping Time" Biological Cybernetics, Jun. 28, 2002, pp. 428-439, Springer-Verlag, Germany.

Gaines, B.R., "Stochastic Computing Systems", Advances in Information Systems Science, Chapter 2, 1969, pp. 37-172, Plenum Press, USA.

(56) References Cited

OTHER PUBLICATIONS

Brette, R. et al., "Adaptive Exponential Integrate-and-Fire Model as an Effective Description of Neuronal Activity", Journal of Neurophysiology, Jul. 13, 2005, pp. 1-7, United States
U.S. Non-Final Office Action for U.S. Appl. No. 13/235,341 dated Dec. 24, 2013.
U.S. Final Office Action for U.S. Appl. No. 13/235,341 dated Apr. 17, 2014.
U.S. Notice of Allowance for U.S. Appl. No. 13/235,341 dated Jul. 29, 2014.
U.S. Non-Anal Office Action for U.S. Appl. No. 13/585,010 dated Jul. 28, 2015.
U.S. Notice of Allowance for U.S. Appl. No. 13/585,010 dated Oct. 6, 2015.
U.S. Non-Final Office Action for U.S. Appl. No. 13/149,754 dated Jul. 8, 2013.
U.S. Final Office Action for U.S. Appl. No. 13/149,754 dated Dec. 11, 2013.
U.S. Notice of Allowance for U.S. Appl. No. 13/149,754 dated Feb. 24, 2014.
U.S. Non-Final Office Action for U.S. Appl. No. 13/957,805 dated Nov. 20, 2015.
U.S. Final Office Action for U.S. Appl. No. 13/957,805 dated Jun. 2, 2016.
U.S. Advisory Action for U.S. Appl. No. 13/957,805 dated Aug. 31, 2016.
U.S. Notice of Allowance for U.S. Appl. No. 13/957,805 dated Sep. 15, 2016.

* cited by examiner

US 9,984,324 B2

DUAL DETERMINISTIC AND STOCHASTIC NEUROSYNAPTIC CORE CIRCUIT

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation and, in particular, a dual deterministic and stochastic neurosynaptic core circuit.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses.

BRIEF SUMMARY

One embodiment provides a system comprising a memory device for maintaining deterministic neural data relating to a digital neuron and a logic circuit for deterministic neural computation and stochastic neural computation. Deterministic neural computation comprises processing a neuronal state of the neuron based on the deterministic neural data maintained. Stochastic neural computation, wherein stochastic neural computation comprises generating stochastic neural data relating to the neuron and processing the neuronal state of the neuron based on the stochastic neural data generated.

Another embodiment provides a method comprising maintaining deterministic neural data relating to a neuron for deterministic neural computation, generating stochastic neural data relating to the neuron for stochastic neural computation, and processing a neuronal state of the neuron based on one of the deterministic neural data maintained and the stochastic neural data generated.

These and other features, aspects, and advantages of the present invention will become understood with reference to the following description, appended claims and accompanying figures.

DETAILED DESCRIPTION

Embodiments of the invention relate to neuromorphic and synaptronic computation and, in particular, a dual deterministic and stochastic neurosynaptic core circuit. The core circuit of the invention may be used in systems and processes that require deterministic and/or stochastic algorithms and computations. Deterministic algorithms and computations provide a predictable output for a given input. By comparison, stochastic algorithms and computations involve randomness. Examples of stochastic algorithms and computations include sampling algorithms like Monte Carlo sampling and Gibbs sampling, and Noisy-OR/AND functions.

The core circuit of the invention may also be used to implement computation modes requiring stochastic (i.e., non-deterministic) values, such as Boltzmann machines, noisy gradient descent, simulated annealing, stochastic resonance, soften/round-out non-linear transfer functions, and other modes of computation. As described in detail later herein, the core circuit may incorporate stochasticity dynamically or at run time.

The term digital neuron as used herein represents an framework configured to simulate a biological neuron. An digital neuron creates connections between processing elements that are roughly functionally equivalent to neurons of a biological brain. As such, a neuromorphic and synaptronic computation comprising digital neurons, according to embodiments of the invention, may include various electronic circuits that are modeled on biological neurons. Further, a neuromorphic and synaptronic computation comprising digital neurons, according to embodiments of the invention, may include various processing elements (including computer simulations) that are modeled on biological neurons. Although certain illustrative embodiments of the invention are described herein using digital neurons comprising digital circuits, the present invention is not limited to digital circuits. A neuromorphic and synaptronic computation, according to embodiments of the invention, can be implemented as a neuromorphic and synaptronic framework comprising circuitry and additionally as a computer simulation. Indeed, embodiments of the invention can take the form of an entirely hardware embodiment, an entirely software embodiment, or an embodiment containing both hardware and software elements.

In one embodiment, a neuromorphic system comprises a system that implements neuron models, synaptic models, neural algorithms, and/or synaptic algorithms. In one embodiment, a neuromorphic system comprises software components and/or hardware components, such as digital hardware, analog hardware or a combination of analog and digital hardware (i.e., mixed-mode).

Figure 1:
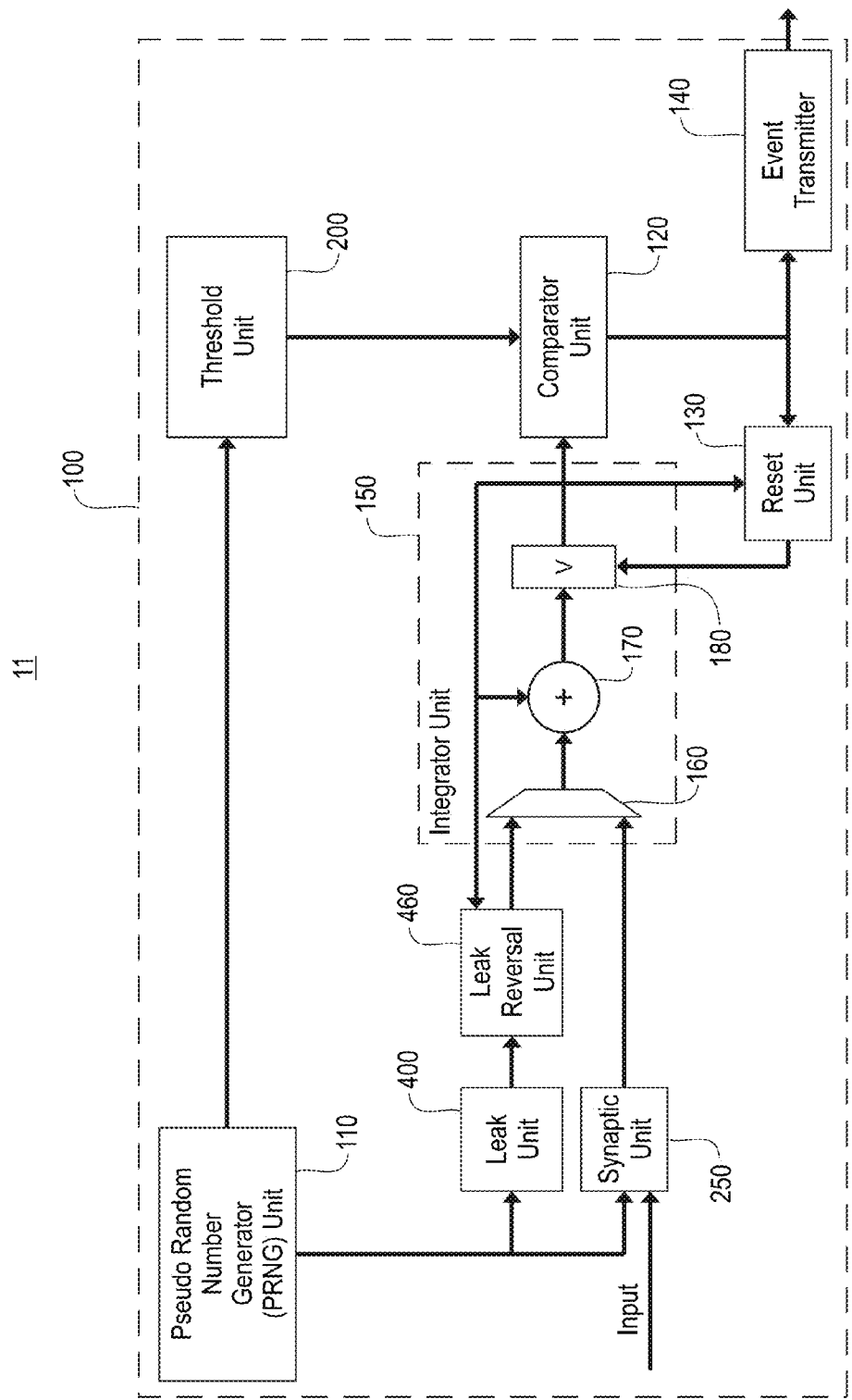
FIG. 1 illustrates an example dual stochastic and deterministic digital neuron, in accordance with an embodiment of the invention.

FIG. 1 illustrates an example dual stochastic and deterministic digital neuron 11, in accordance with an embodiment of the invention. The neuron 11 comprises a computation logic circuit 100. The circuit 100 receives and processes incoming neuronal firing events (e.g., incoming spiking events/packets) targeting the neuron 11. The circuit 100 updates a neuronal state of the neuron 11 based on the incoming neuronal firing events received. For example, for at least one incoming neuronal firing event received, the circuit 100 integrates a corresponding synaptic input into a membrane potential variable V of the neuron 11.

The circuit 100 comprises an integrator unit (i.e., integrator device) 150 for integrating synaptic input. The circuit 100 further comprises a synaptic unit (i.e., synaptic device) 250 configured to receive incoming neuronal firing events targeting the neuron 11. For at least one incoming neuronal firing event received, the synaptic unit 250 is further configured to provide the integrator unit 150 with a corresponding synaptic input. As described in detail later herein, a synaptic input may be a deterministic value or a stochastic value. The integrator unit 150 integrates each synaptic input provided by the synaptic unit 250 into the membrane potential variable V of the neuron 11.

The circuit 100 further comprises a leak unit (i.e., leak device) 400 configured to provide a leak weight value Lk for the neuron 11. The leak weight value Lk may be a deterministic value or a stochastic value. The circuit 100 further comprises a leak reversal unit (i.e., leak reversal device) 460 configured to provide the integrator unit 150 with an output leak weight value $Lk_{OUT}$. As described in detail later herein, the output leak weight value $Lk_{OUT}$ is either the leak weight value Lk from the leak unit 400 or a reversed leak weight value $Lk_{REV}$. The integrator unit 150 integrates each output leak weight value $Lk_{OUT}$ provided by the leak reversal unit 460 into the membrane potential variable V of the neuron 11.

The integrator unit 150 comprises a multiplexer 160, an adder 170, and a register 180. The register 180 maintains a temporary variable representing the membrane potential variable V of the neuron 11. The multiplexer 160 selects a parameter to integrate into the membrane potential variable V. Specifically, when the circuit 100 is processing an incoming neuronal firing event, the multiplexer 160 selects a corresponding synaptic input to integrate into the membrane potential variable V. When the circuit 100 has processed all incoming neuronal firing events received during a time step, the multiplexer 160 selects an output leak weight value $Lk_{OUT}$ to integrate into the membrane potential variable V.

The adder 170 adds/integrates each parameter selected by the multiplexer 160 into the membrane potential variable V of the neuron 11. If a selected parameter is a synaptic input, the adder 180 integrates the synaptic input into the membrane potential variable V. Each synaptic input may increase or decrease the membrane potential variable V. If the selected parameter is an output leak weight value $Lk_{OUT}$, the adder 180 integrates the output leak weight value $Lk_{OUT}$ into the membrane potential variable V. Each output leak weight value $Lk_{OUT}$ may increase or decrease the membrane potential variable V.

The circuit 100 further comprises a comparator unit (i.e., comparator device) 120 and a threshold unit (i.e., threshold device) 200. The threshold unit 200 is configured to provide the comparator unit 120 with a threshold value Th for the neuron 11. As described in detail later herein, the threshold value Th may be a deterministic value or a stochastic value. The comparator unit 200 is configured to determine whether the membrane potential variable V of the neuron 11 is greater than or equal to the threshold value Th. The neuron 11 spikes when the membrane potential variable V of the neuron 11 is greater than or equal to the threshold value Th.

The circuit 100 further comprises a reset unit (i.e., reset device) 130 and an event transmitter 140. The event transmitter 140 is configured to generate and transmit an outgoing neuronal firing event (e.g., an outgoing spike event/packet) when the neuron 11 spikes. When the neuron 11 spikes, the reset unit 130 is configured to set the membrane potential variable V to a reset value. As described in detail later herein, the reset unit 130 sets the membrane potential variable V to one of the following reset values: a stored reset value $V_{RESET}$, a non-reset value equal to the membrane potential variable V (i.e., the membrane potential variable V remains the same), or a linear reset value $V_{LINEAR}$. In one embodiment, the stored reset value $V_{RESET}$ is a zero value.

When stochastic values are used for synaptic inputs, the threshold value Th and/or the output leak weight value $Lk_{OUT}$, the neuron 11 spikes/fires at an average firing rate proportional to a relative magnitude of the membrane potential variable V of the neuron 11.

The neuron 11 operates in a deterministic order. In one embodiment, the neuron 11 operates in the following order during each time step: first, each synapse that the neuron 11 is connected with is evaluated in order to integrate any synaptic input from said synapse into the membrane potential variable V of the neuron 11. For example, if the neuron 11 is connected with 256 synapses, the synapses are evaluated in order from the first synapse (e.g., synapse 0) to the last synapse (e.g., synapse 255) during the time step. Second, after all synapses have been evaluated, an output leak weight value $Lk_{OUT}$ for the neuron 11 is determined and integrated into the membrane potential variable V. Third, a threshold value Th is determined and compared against the membrane potential variable V to determine whether the neuron 11 has spiked.

In one embodiment, the circuit 170 further comprises a pseudo-random number generator (PRNG) unit (i.e., PRNG device) 110 for generating pseudo-random values/numbers for use in stochastic operations/computation. Specifically, the PRNG unit 110 generates a sequence of pseudo-random values using a configurable random seed. In one embodiment, the PRNG unit 110 is a linear feedback shift register (LFSR) or an XOR shift register.

As described in detail later herein, the threshold unit 200, the synaptic unit 250 and the leak unit 400 draw pseudo-random values from the PRNG unit 110 to generate stochastic values for the threshold value Th, a synaptic input and the leak weight value Lk, respectively. The PRNG unit 110 deterministically increments the sequence of pseudo-random values each time the threshold unit 200 provides a stochastic threshold value, the synaptic unit 250 provides a stochastic synaptic input or the leak unit 400 provides a stochastic leak weight value. The sequence of pseudo-random values generated by the PRNG unit 110 advances in a predictable manner (i.e., the PRNG unit 110 generates predictable values), thereby enabling repeatable stochastic computations for reliability and verification (e.g., providing one-to-one operation between hardware and software simulation for testing and debugging purposes). In one embodiment, the PRNG unit 110 is a linear feedback shift register (LFSR) or an XOR shift register.

In another embodiment, the circuit 170 comprises a true random number generator for generating random values/numbers for use in stochastic operations/computation. Unlike the PRNG unit 110, the true random number generator generates a sequence of random values that is unpredictable (i.e., the true random number generator does not generate predictable values).

Figure 2:
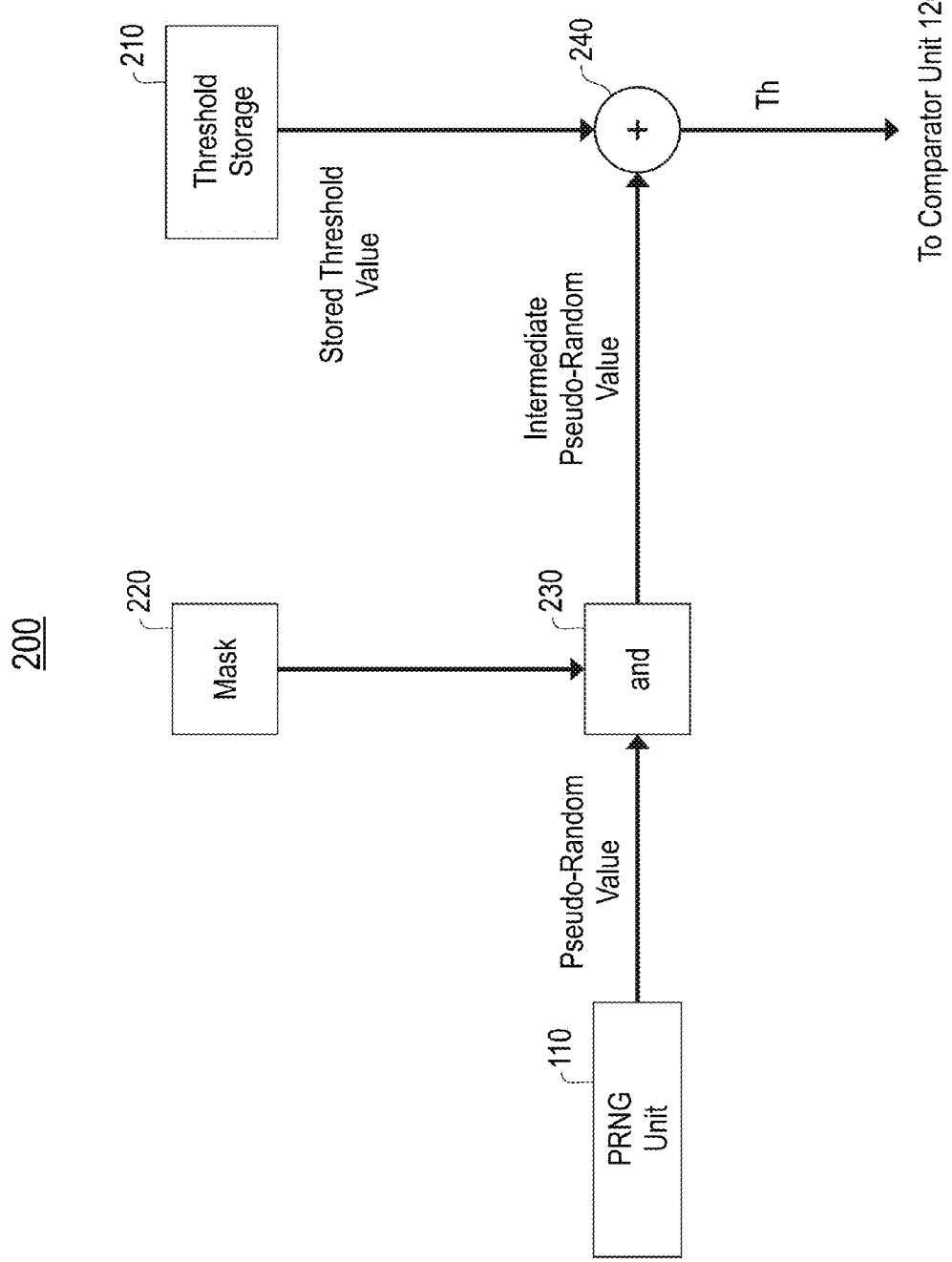
FIG. 2 illustrates an example threshold unit of a neuron, in accordance with an embodiment of the invention.

FIG. 2 illustrates an example threshold unit 200 of a neuron 11, in accordance with an embodiment of the invention. The threshold unit 200 comprises a threshold storage unit 210, a mask unit 220, an AND unit 230, and an adder 240. The threshold storage unit 210 stores a configurable threshold value. The mask unit 220 stores a configurable mask value. In one embodiment, the threshold storage unit 210 and the mask unit 220 are registers or random access memories (RAMs).

The PRNG unit 110 generates a pseudo-random value. The AND unit 230 bit-wise ANDs the stored mask value and the generated pseudo-random value to generate an intermediate pseudo-random value. The intermediate pseudo-random value is a zero value if the mask value is a zero value. The intermediate pseudo-random value is a non-zero value the mask value is a non-zero value.

The adder 240 adds the intermediate pseudo-random value to the stored threshold value to generate a threshold value Th for the neuron 11. If the intermediate pseudo-random value is a zero value, the threshold value Th is a deterministic threshold value $Th_{DET}$ equal to the stored threshold value. If the intermediate pseudo-random value is a non-zero value, the threshold value Th is a stochastic threshold value $Th_{STOCH}$ equal to the sum of the intermediate pseudo-random value and the stored threshold value. The threshold value Th is forwarded to the comparator unit 120. The comparator unit 120 determines whether the membrane potential variable V of the neuron 11 is greater than or equal to the threshold value Th.

A new pseudo-random value is drawn from the PRNG unit 110 each time the threshold value Th is a stochastic threshold value $Th_{STOCH}$.

Figure 3:
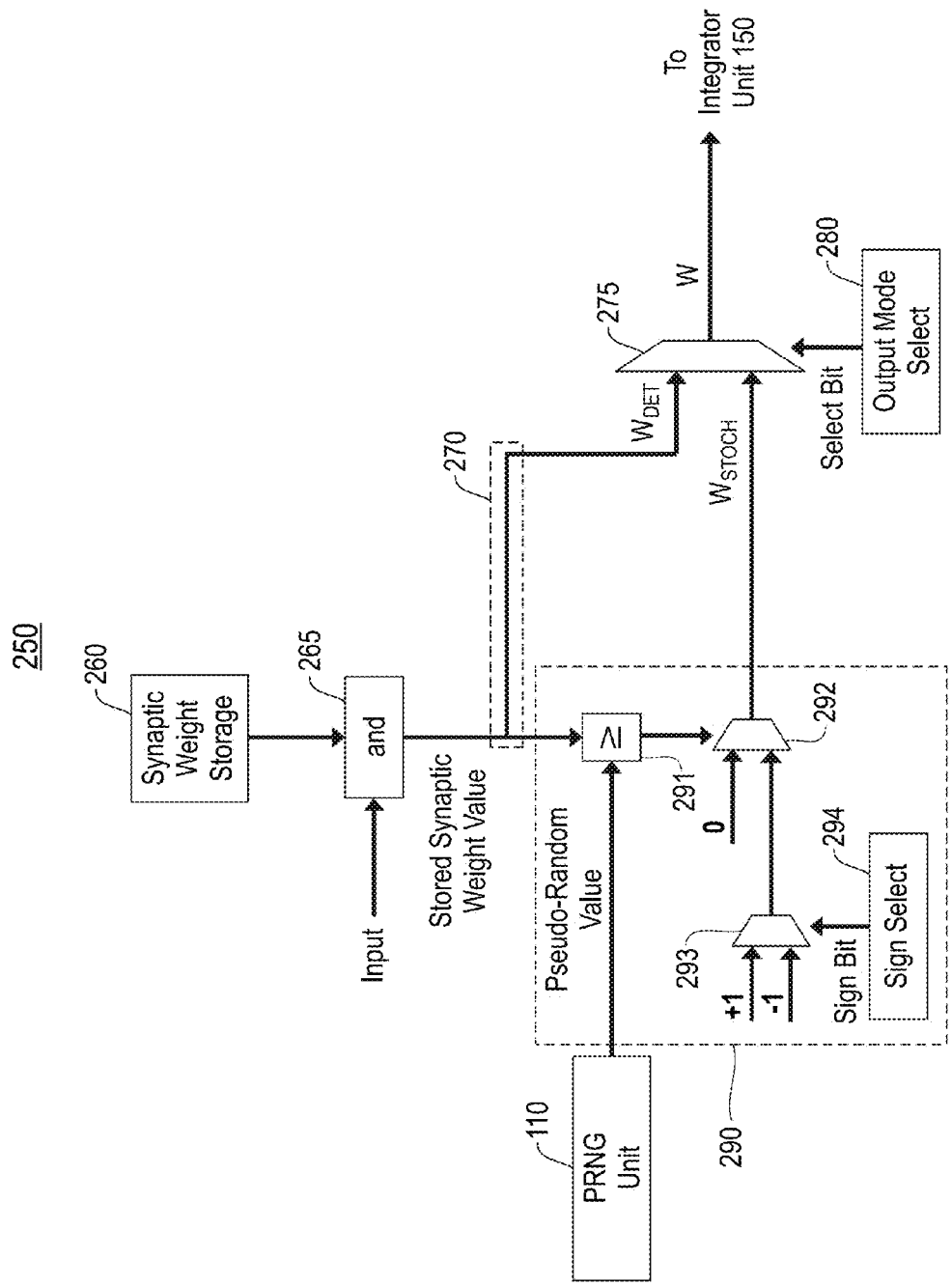
FIG. 3 illustrates an example synaptic unit of a neuron, in accordance with an embodiment of the invention.

FIG. 3 illustrates an example synaptic unit 250 of a neuron 11, in accordance with an embodiment of the invention. The synaptic unit 250 comprises a synaptic weight storage unit 260, an AND unit 265, a deterministic pathway 270, a stochastic pathway 290, a multiplexer 275, and an output mode select unit 280. The synaptic weight storage unit 260 stores a configurable synaptic weight value corresponding to a synapse that the neuron 11 is connected with. In one embodiment, the synaptic weight storage unit 260 is a register or a random access memory (RAM).

The AND unit 265 is configured to receive input (e.g., an incoming neuronal firing event targeting the neuron 11). If the received input is non-zero, the AND unit 265 forwards the stored synaptic weight value to both the deterministic pathway 270 and the stochastic pathway 290.

The deterministic pathway 270 forwards a deterministic synaptic weight value $W_{DET}$ to the multiplexer 275. The deterministic synaptic weight value $W_{DET}$ is equal to the stored synaptic weight value.

The stochastic pathway 290 forwards a stochastic synaptic weight value $W_{STOCH}$ to the multiplexer 275. In one embodiment, the stochastic pathway 290 comprises a comparator unit 291, a sign select unit 294, and two multiplexers 292, 293. The comparator unit 291 instructs the multiplexer 292 to forward either a zero value or a non-zero value as the stochastic synaptic weight value $W_{STOCH}$.

Specifically, the comparator unit 291 draws a pseudo-random value from the PRNG unit 110 and determines whether the stored synaptic weight value is greater than or equal to the drawn pseudo-random value. If the stored synaptic weight value is less than the drawn pseudo-random value, the comparator unit 291 instructs the multiplexer 292 to forward a zero value as the stochastic synaptic weight value $W_{STOCH}$. If the stored synaptic weight value is greater than or equal to the drawn pseudo-random value, the comparator unit 291 instructs the multiplexer 292 to forward a non-zero value as the stochastic synaptic weight value $W_{STOCH}$. The multiplexer 292 obtains the non-zero value from the multiplexer 293.

In one embodiment, the multiplexer 293 forwards the multiplexer 292 either a positive integer (e.g., +1) or a negative integer (e.g., −1). The sign select unit 294 provides the multiplexer 293 with a configurable sign bit that indicates whether the non-zero value should be a positive integer or a negative integer. For example, the multiplexer 293 forwards a positive integer (e.g., +1) as the non-zero value if the sign bit is '0'. The multiplexer 293 forwards a negative integer (e.g., −1) as the non-zero value if the sign bit is '1'. In one embodiment, a positive non-zero value and a negative non-zero value represent excitatory synaptic input and inhibitory synaptic input, respectively.

The multiplexer 275 is configured to select either the deterministic synaptic weight value $W_{DET}$ from the deterministic pathway 270 or the stochastic synaptic weight value $W_{STOCH}$ from the stochastic pathway 290 based on a configurable select bit provided by the output mode select unit 280. The select bit indicates which of the two synaptic weight values that the multiplexer 275 should select. The multiplexer 275 forwards the selected synaptic weight value W to the integrator unit 150. The integrator unit 150 integrates the selected synaptic weight value W as a synaptic input into the membrane potential variable V of the neuron 11.

A new pseudo-random value is drawn from the PRNG unit 110 each time the comparator unit 291 uses a current pseudo-random value.

In one embodiment, each deterministic synaptic weight value $W_{DET}$ comprises a digital N-bit value, wherein N is a positive integer. The number of different deterministic synaptic weight values $W_{DET}$ is $2^N$. Assuming unsigned values, the largest possible deterministic synaptic weight value $W_{DET}$ is $2^{N-1}$, and the smallest possible non-zero deterministic synaptic weight value $W_{DET}$ is 1. The number of different stochastic synaptic weight values $W_{STOCH}$ is $2^N$. A stochastic synaptic weight value $W_{STOCH}$ may be a fractional value. Therefore, the total number of different synaptic weight values may be $2^{N+1}$.

In one embodiment, an expected value E for a synaptic input X is determined in accordance with relation (1) provided below:

$$E[X] = \sum_j p(X = x_j) * x_j \quad (1)$$
$$= 0^*(p(X = 0)) + 1^*(p(X = 1))$$
$$= p(X = 1)$$

wherein $x_j$ is either 0 or 1, and wherein probability $p(X=0)=1-p(X=1)$. The circuit 100 interprets a stochastic synaptic weight $W_{STOCH}$ as probability $p(X=1)$. Probability $p(X=1)$ may range between $2^{-N}$ to 1 in increments of $2^{-N}$. Therefore, the expected value of the synaptic input may be a fractional value in the range between $2^{-N}$ to 1.

Figure 4A:
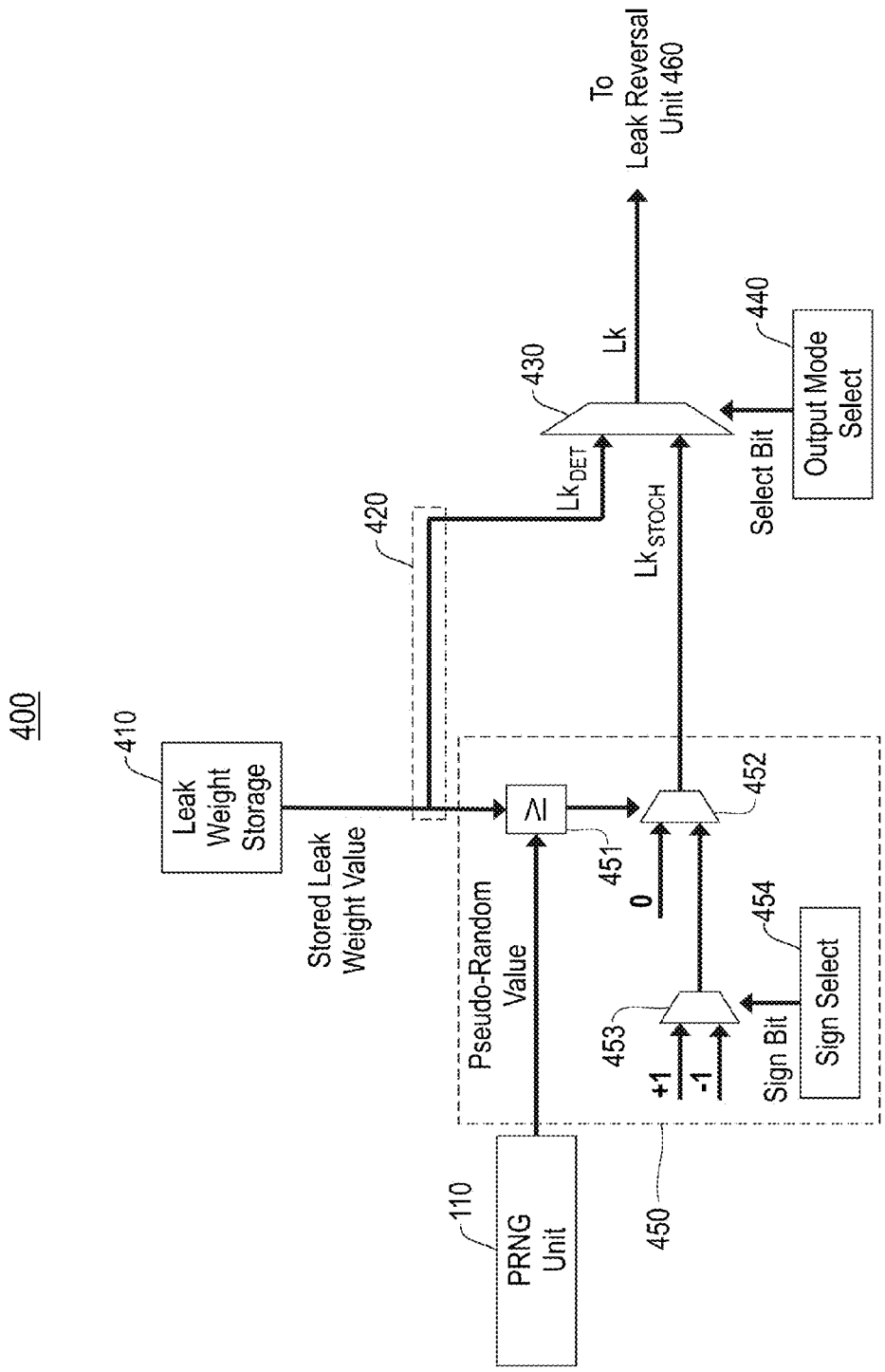
FIG. 4A illustrates an example leak unit of a neuron, in accordance with an embodiment of the invention.

FIG. 4A illustrates an example leak unit 400 of a neuron 11, in accordance with an embodiment of the invention. The leak unit 400 comprises a leak weight storage unit 410, a deterministic pathway 420, a stochastic pathway 450, a multiplexer 430, and an output mode select unit 440. The leak weight storage unit 410 stores a configurable leak weight value for the neuron 11. In one embodiment, the leak weight storage unit 410 is a register or a random access memory (RAM). The stored leak weight value is forwarded to both the deterministic pathway 420 and the stochastic pathway 450.

The deterministic pathway 420 forwards a deterministic leak weight value $Lk_{DET}$ to the multiplexer 430. The deterministic leak weight value $Lk_{DET}$ is equal to the stored leak weight value.

The stochastic pathway 450 forwards a stochastic leak weight value $Lk_{STOCH}$ to the multiplexer 430. In one embodiment, the stochastic pathway 450 comprises a comparator unit 451, a sign select unit 454, and two multiplexers 452, 453. The comparator unit 451 instructs the multiplexer 452 to forward either a zero value or a non-zero value as the stochastic leak weight value $Lk_{STOCH}$.

Specifically, the comparator unit 451 draws a pseudo-random value from the PRNG unit 110 and determines whether the stored leak weight value is greater than or equal to the drawn pseudo-random value. If the stored leak weight value is less than the drawn pseudo-random value, the comparator unit 451 instructs the multiplexer 452 to forward a zero value as the stochastic leak weight value $Lk_{STOCH}$. If the stored leak weight value is greater than or equal to the drawn pseudo-random value, the comparator unit 451 instructs the multiplexer 452 to forward a non-zero value as the stochastic leak weight value $Lk_{STOCH}$. The multiplexer 452 obtains the non-zero value from the multiplexer 453.

In one embodiment, the multiplexer 453 forwards the multiplexer 452 either a positive integer (e.g., +1) or a negative integer (e.g., −1). The sign select unit 454 provides the multiplexer 453 with a configurable sign bit that indicates whether the non-zero value should be a positive integer or a negative integer. For example, the multiplexer 453 forwards a positive integer (e.g., +1) as the non-zero value if the sign bit is '0'. The multiplexer 453 forwards a negative integer (e.g., −1) as the non-zero value if the sign bit is '1'. In one embodiment, a positive non-zero value and a negative non-zero value represent excitatory leak input and inhibitory leak input, respectively.

The multiplexer 430 is configured to select either the deterministic leak weight value $Lk_{DET}$ from the deterministic pathway 420 or the stochastic leak weight value $Lk_{STOCH}$ from the stochastic pathway 450 based on a configurable select bit provided by the output mode select unit 440. The output mode select unit 440 provides a select bit indicating which leak weight value to select. The select bit indicates which of the two leak weight values that the multiplexer 430 should select. The multiplexer 430 forwards the selected leak weight value Lk to the leak reversal unit 460.

A new pseudo-random value is drawn from the PRNG unit 110 each time the comparator unit 451 uses a current pseudo-random value.

In one embodiment, each deterministic leak weight value $Lk_{DET}$ comprises a digital N-bit value, wherein N is a positive integer. The number of different deterministic leak weight values $Lk_{DET}$ is $2^N$. Assuming unsigned values, the largest possible deterministic leak weight value $Lk_{DET}$ is $2^{N-1}$, and the smallest possible non-zero deterministic leak weight value $Lk_{DET}$ is 1. The number of different stochastic leak weight values $Lk_{STOCH}$ is $2^N$. A stochastic leak weight value $Lk_{STOCH}$ may be a fractional value. Therefore, the total number of different leak weight values may be $2^{N+1}$.

The neuron 11 may be utilized in stochastic computations (e.g., Noisy-OR/AND, etc.) using stochastic synaptic weight values $W_{STOCH}$. The neuron 11 may be also be utilized in stochastic sampling computations (e.g., Monte-Carlo sampling, Gibbs sampling, etc.) using stochastic leak weight values $Lk_{STOCH}$ and/or stochastic threshold values $Th_{STOCH}$. The neuron 11 may be also be utilized in algorithms requiring stochastic data values (e.g., Boltzmann machines, noisy gradient descent, simulated annealing, stochastic resonance, etc.) using stochastic threshold values $Th_{STOCH}$.

Figure 4B:
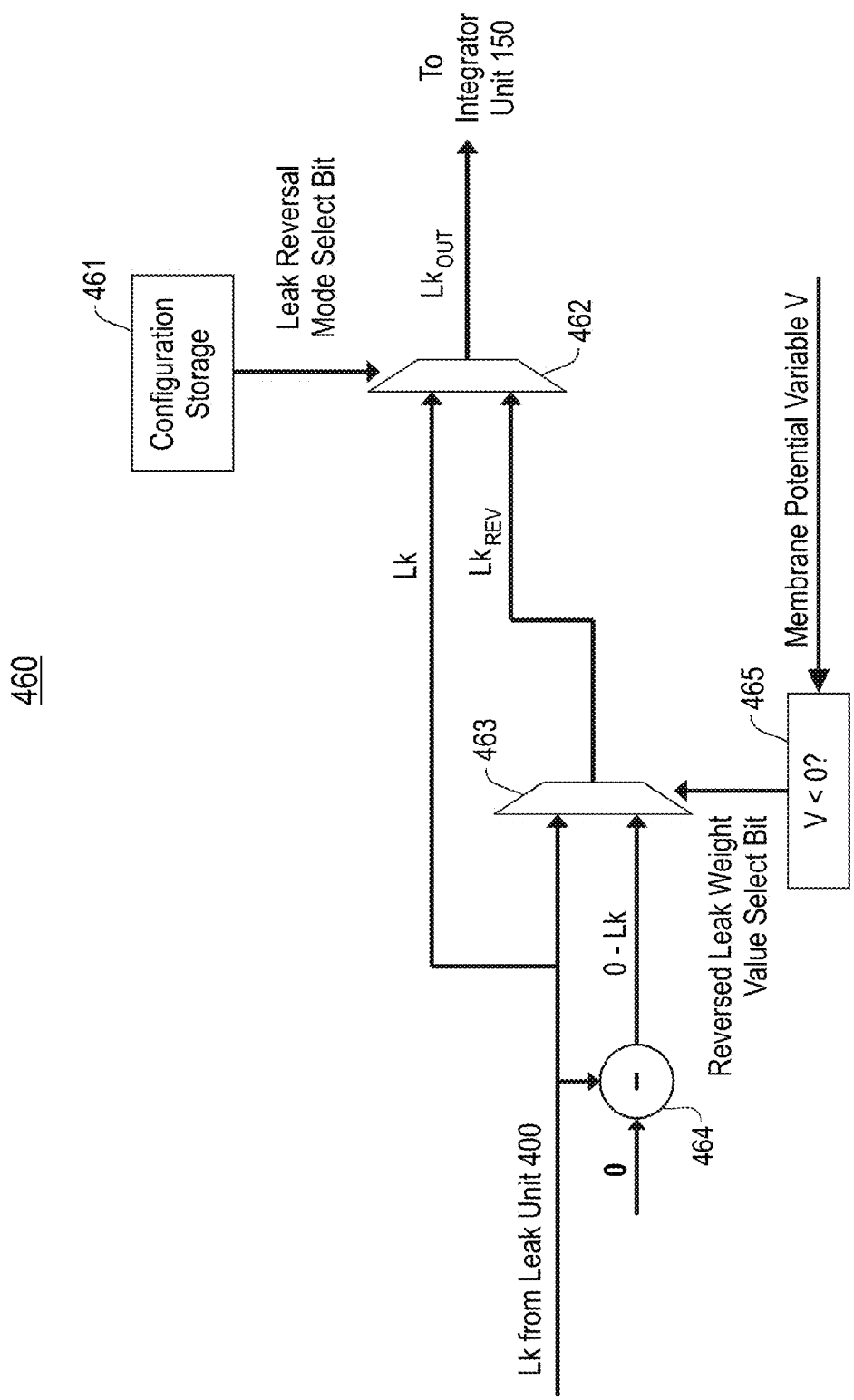
FIG. 4B illustrates an example leak reversal unit of a neuron, in accordance with an embodiment of the invention.

FIG. 4B illustrates an example leak reversal unit 460 of a neuron 11, in accordance with an embodiment of the invention. The leak reversal unit 460 comprises a configuration storage unit 461, a first multiplexer 462, a second multiplexer 463, a difference unit 464, and a reversed leak weight value select unit 465. In one embodiment, the configuration storage unit 410 is a register or a random access memory (RAM). The configuration storage unit 461 stores configurable data indicating a leak mode.

A leak mode defines a manner for integrating leak weight values into a membrane potential variable V of the neuron 11. There are different leak modes for the neuron 11. As described in detail later herein, the leak reversal unit 460 is configured to facilitate the operation of a monotonic (i.e., standard) leak mode and a leak reversal mode. The configurable data maintained in the configuration storage unit 461 may comprise a leak reversal mode select bit indicating whether a leak reversal mode has been selected. The neuron 11 operates in a leak reversal mode when the leak reversal mode is selected; otherwise, the neuron 11 operates in a monotonic leak mode.

The first multiplexer 462 is configured to select between the leak weight value Lk from the leak unit 400 or a reversed leak weight value $Lk_{REV}$ from the second multiplexer 463 as an output leak weight value $Lk_{OUT}$. The first multiplexer 462 is further configured to forward the output leak weight value $Lk_{OUT}$ to the integrator unit 150, where the output leak weight value $Lk_{OUT}$ is integrated into the membrane potential variable V.

Specifically, when the neuron 11 operates in a monotonic leak mode, the first multiplexer 462 selects and forwards the leak weight value Lk from the leak unit 400 to the integrator unit 150. When the neuron 11 operates in a leak reversal mode, the first multiplexer 462 selects and forwards the reversed leak weight value $Lk_{REV}$ from the second multiplexer 463 to the integrator unit 150.

The second multiplexer 463 is configured to select between the leak weight value Lk from the leak unit 400 or an opposite/reversed value of the leak weight value Lk (i.e., a difference value equal to zero minus the leak weight value Lk) as the reversed leak weight value $Lk_{REV}$. Specifically, the second multiplexer 463 selects the leak weight value Lk from the leak unit 400 as the reversed leak weight value $Lk_{REV}$ when the membrane potential variable V is equal to or greater than zero. The second multiplexer 463 selects the opposite value of the leak weight value Lk as the reversed leak weight value $Lk_{REV}$ when the membrane potential variable V is less than zero.

The difference unit 464 is configured to determine the opposite value of the leak weight value Lk (i.e., a difference value equal to zero minus the leak weight value Lk). The reversed leak weight value select unit 465 is configured to determine whether the membrane potential variable V is less than zero, and provide the second multiplexer 463 with information (e.g., a reversed leak weight value select bit) indicating whether the membrane potential variable V is less than zero.

Figure 4C:
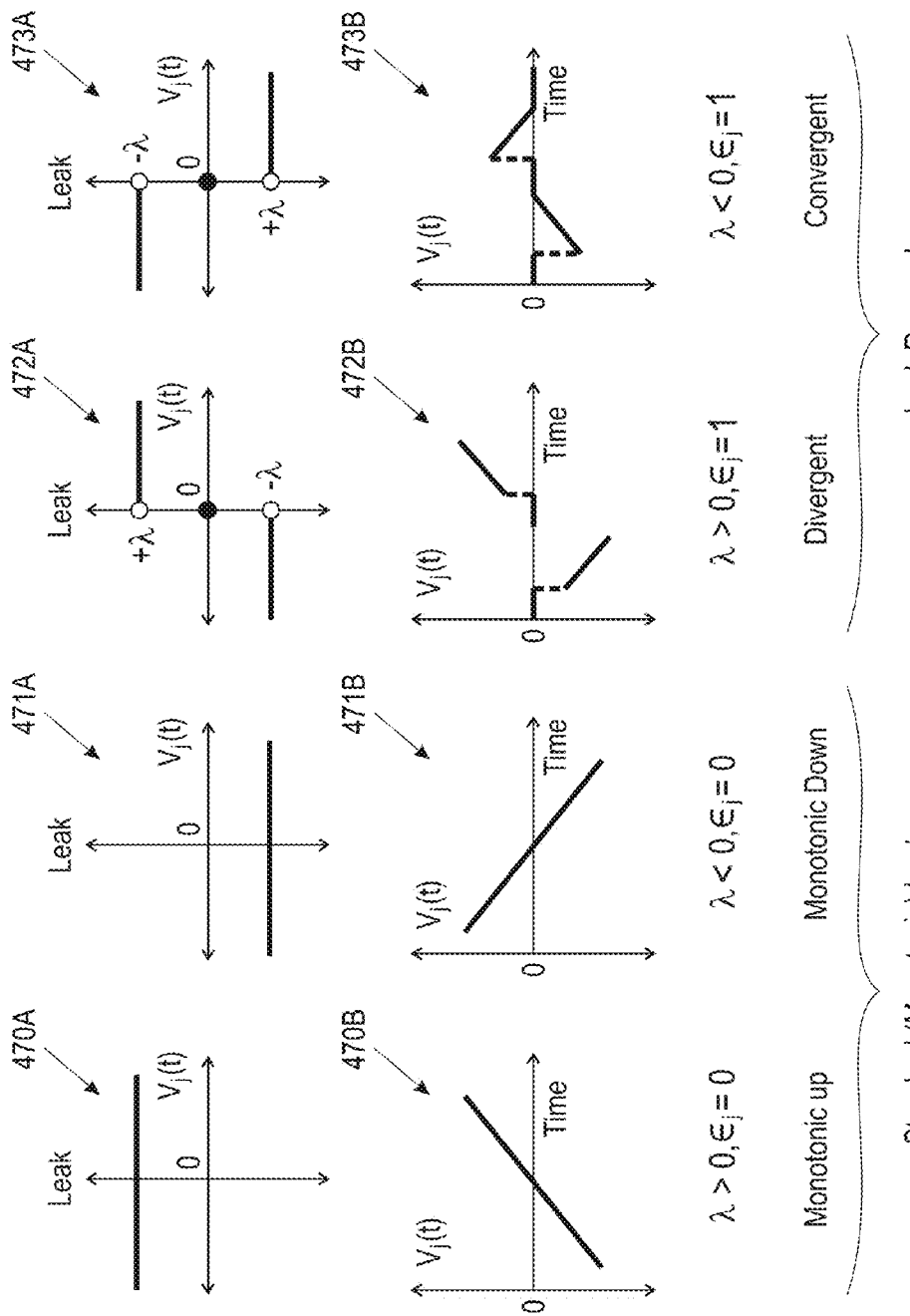
FIG. 4C illustrates example graphs representing different leak modes, in accordance with an embodiment of the invention.

FIG. 4C illustrates example graphs representing different leak modes, in accordance with an embodiment of the invention. There are two different types of monotonic leak modes—a monotonic up leak mode, and a monotonic down leak mode. A first graph 470A and a corresponding second graph 470B illustrate a neuron 11 operating in a monotonic up leak mode. The first graph 470A illustrates a leak weight value relative to the membrane potential variable V. The second graph 470B illustrates the membrane potential variable V over time. As shown in graphs 470A and 470B, a neuron 11 operates in a monotonic up leak mode when the leak reversal unit 460 forwards one or more positive leak weight values Lk (i.e., λ>0) from the leak unit 400 to the integrator unit 150, thereby increasing the membrane potential variable V over time.

A third graph 471A and a corresponding fourth graph 471B illustrate a neuron 11 operating in a monotonic down leak mode. The third graph 471A illustrates the leak weight value relative to the membrane potential variable V. The fourth graph 471B illustrates the membrane potential variable V over time. As shown in graphs 471A and 471B, a neuron 11 operates in a monotonic down leak mode when the leak reversal unit 460 forwards one or more negative leak weight values Lk (i.e., λ<0) from the leak unit 400 to the integrator unit 150, thereby decreasing the membrane potential variable V over time.

There are two different types of leak reversal modes—a divergent leak reversal mode, and a convergent leak reversal mode. A fifth graph 472A and a corresponding sixth graph 472B illustrate a neuron 11 operating in a divergent leak reversal mode. The fifth graph 472A illustrates the leak weight value relative to the membrane potential variable V. The sixth graph 472B illustrates the membrane potential variable V over time. A neuron 11 operates in a divergent leak reversal mode when the membrane potential variable V diverges over time. As shown in graphs 472A and 472B, if the leak weight value Lk from the leak unit 400 is a positive value (i.e., λ>0), the membrane potential variable V decreases when the opposite value of the leak weight value Lk is selected as the reversed leak value $Lk_{REV}$ (i.e., the selected reversed leak value $Lk_{REV}$ is a negative value) and increases when the leak weight value Lk is selected as the as the reversed leak value $Lk_{REV}$ (i.e., the selected reversed leak value $Lk_{REV}$ is a positive value).

A seventh graph 473A and a corresponding eight graph 473B illustrate a neuron 11 operating in a convergent leak reversal mode. The seventh graph 473A illustrates the leak weight value relative to the membrane potential variable V. The eighth graph 473B illustrates the membrane potential variable V over time. A neuron 11 operates in a convergent leak reversal mode when the membrane potential variable V converges over time. As shown in graphs 473A and 473B, if the leak weight value Lk from the leak unit 400 is a negative value (i.e., λ<0), the membrane potential variable V increases when the opposite value of the leak weight value Lk is selected as the reversed leak value $Lk_{REV}$ (i.e., the selected reversed leak value $Lk_{REV}$ is a positive value), and decreases when the leak weight value Lk is selected as the reversed leak value $Lk_{REV}$ (i.e., the selected reversed leak value $Lk_{REV}$ is a negative value).

Figure 4D:
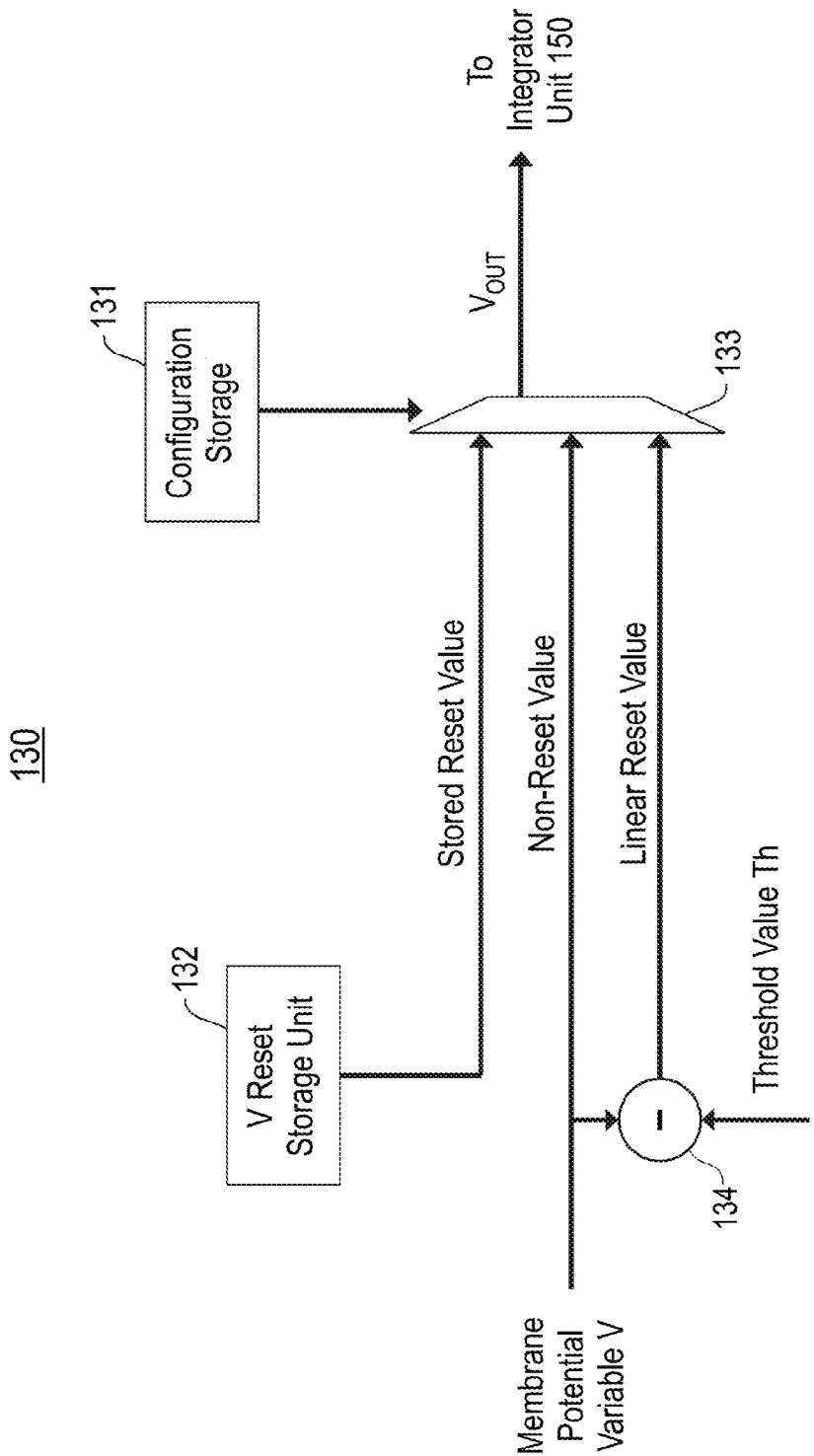
FIG. 4D illustrates an example reset unit of a neuron 11, in accordance with an embodiment of the invention.

FIG. 4D illustrates an example reset unit 130 of a neuron 11, in accordance with an embodiment of the invention. The reset unit 130 comprises a configuration storage unit 131, a V reset storage unit 132, a first multiplexer 133, and a difference unit 134. In one embodiment, the configuration storage unit 131 and/or the V reset storage unit 132 is a register or a random access memory (RAM).

A reset mode defines a manner for resetting the membrane potential variable V of the neuron 11. There are different reset modes for the neuron 11. As described in detail later herein, the reset unit 130 is configured to facilitate the operation of a stored reset mode, a non-reset mode, and a linear reset mode. The configurable data maintained in the configuration storage unit 131 may comprise data indicating which reset mode has been selected.

The first multiplexer 133 provides the integrator unit 150 with an output membrane potential variable $V_{OUT}$ representing a value that the integrator unit 150 should reset membrane potential variable V to. The output membrane potential variable $V_{OUT}$ may be one of the following reset values: a stored reset value $V_{RESET}$ maintained in the V reset storage unit 132, the membrane potential variable V (i.e., the membrane potential variable V remains the same), or a linear reset value $V_{LINEAR}$. Specifically, the first multiplexer 133 is configured to select the stored reset value $V_{RESET}$ as the output membrane potential variable $V_{OUT}$ if the stored reset mode is selected. The first multiplexer 133 is further configured to select the membrane potential variable V as the output membrane potential variable $V_{OUT}$ if the non-reset mode is selected. The first multiplexer 133 is further configured to select the linear reset value $V_{LINEAR}$ as the output membrane potential variable $V_{OUT}$ if the linear reset mode is selected.

The difference unit 134 is configured to determine the linear reset value $V_{LINEAR}$. In one embodiment, the linear reset value $V_{LINEAR}$ represents a difference between the membrane potential variable V and a threshold value Th.

Figure 5:
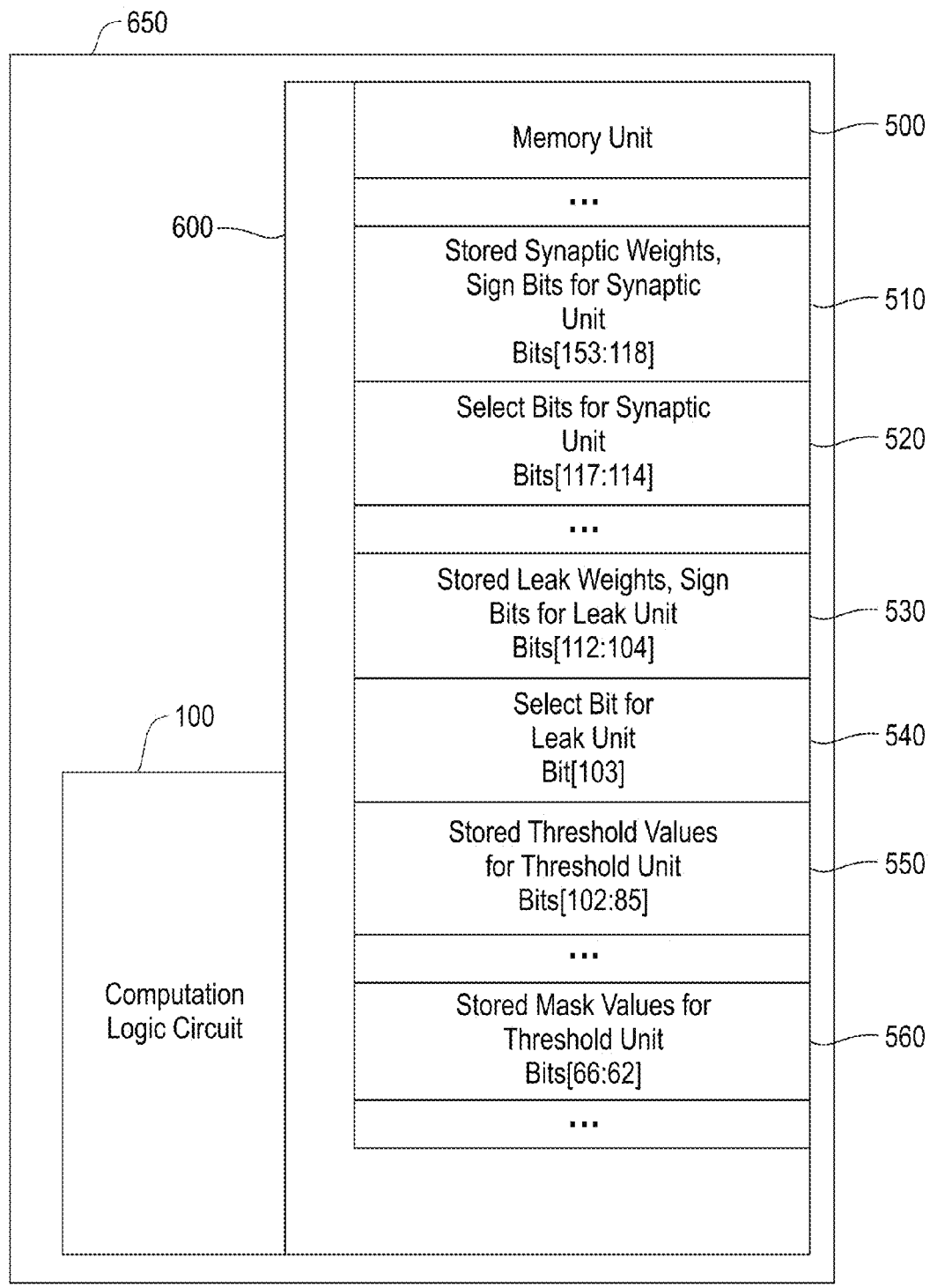
FIG. 5 illustrates an example neurosynaptic core circuit, in accordance with an embodiment of the invention.

FIG. 5 illustrates an example neurosynaptic core circuit 650, in accordance with an embodiment of the invention. The neurosynaptic core circuit 650 comprises a memory unit 500 maintaining configurable parameters for at least one neuron 11. In one embodiment, the neurosynaptic core circuit 650 further comprises a computation logic circuit 100, wherein the logic circuit 100 multiplexes computation and control logic for multiple neurons 11. In another embodiment, the neurosynaptic core circuit 650 further comprises multiple computation logic circuits 100, wherein each computation logic circuit 100 corresponds to a neuron 11 (i.e., each neuron 11 has a dedicated computation logic circuit 100).

In one embodiment, the memory unit 500 is one of the following: a static random access memory (SRAM), a dynamic random access memory (DRAM), a disk drive, a flash drive, a spin random access memory, a magnetoresistive random access memory, a phase change random access memory, or another emerging memory technology. A memory interface circuit 600 bridges the memory unit 500 with the circuit 100.

The parameters maintained in the memory unit 500 include at least the following: a first group 510 of bits including stored synaptic weight values and sign bits for the synaptic unit 250 (e.g., bits 153 to 118), a second group 520 of bits including select bits for the synaptic unit 250 (e.g., bits 117 to 114), a third group 530 of bits including stored leak weight values and sign bits for the leak unit 400 (e.g., bits 112 to 104), a fourth group 540 of bits including a select bit for the leak unit 400 (e.g., bit 103), a fifth group 550 of bits including stored threshold values for the threshold unit 200 (e.g., bits 102 to 85), and a sixth group 560 of bits including stored mask values for the threshold unit 200 (e.g., bits 66 to 62).

The sign bits maintained in the first group 510 of bits are utilized by the sign select unit 294 of the synaptic unit 250. The sign bits maintained in the third group 530 of bits are utilized by the sign select unit 454 of the leak unit 400.

In one embodiment, the memory unit 500 maintains configuration bits that control when the logic circuit 100 performs stochastic neural computation and deterministic neural computation. For example, the select bits maintained in the second group 520 of bits are utilized by the output mode select unit 280 of the synaptic unit 250. The select bit maintained in the fourth group 540 of bits is utilized by the output mode select unit 440 of the leak unit 400. The stored mask values maintained in the sixth group 560 are utilized by the threshold unit 200.

In one embodiment, the memory unit 500 maintains deterministic neural data relating to a neuron 11. For example, the stored synaptic weight values, the stored leak weight values and the stored threshold values represent deterministic neural data relating to the neuron 11.

Figure 6:
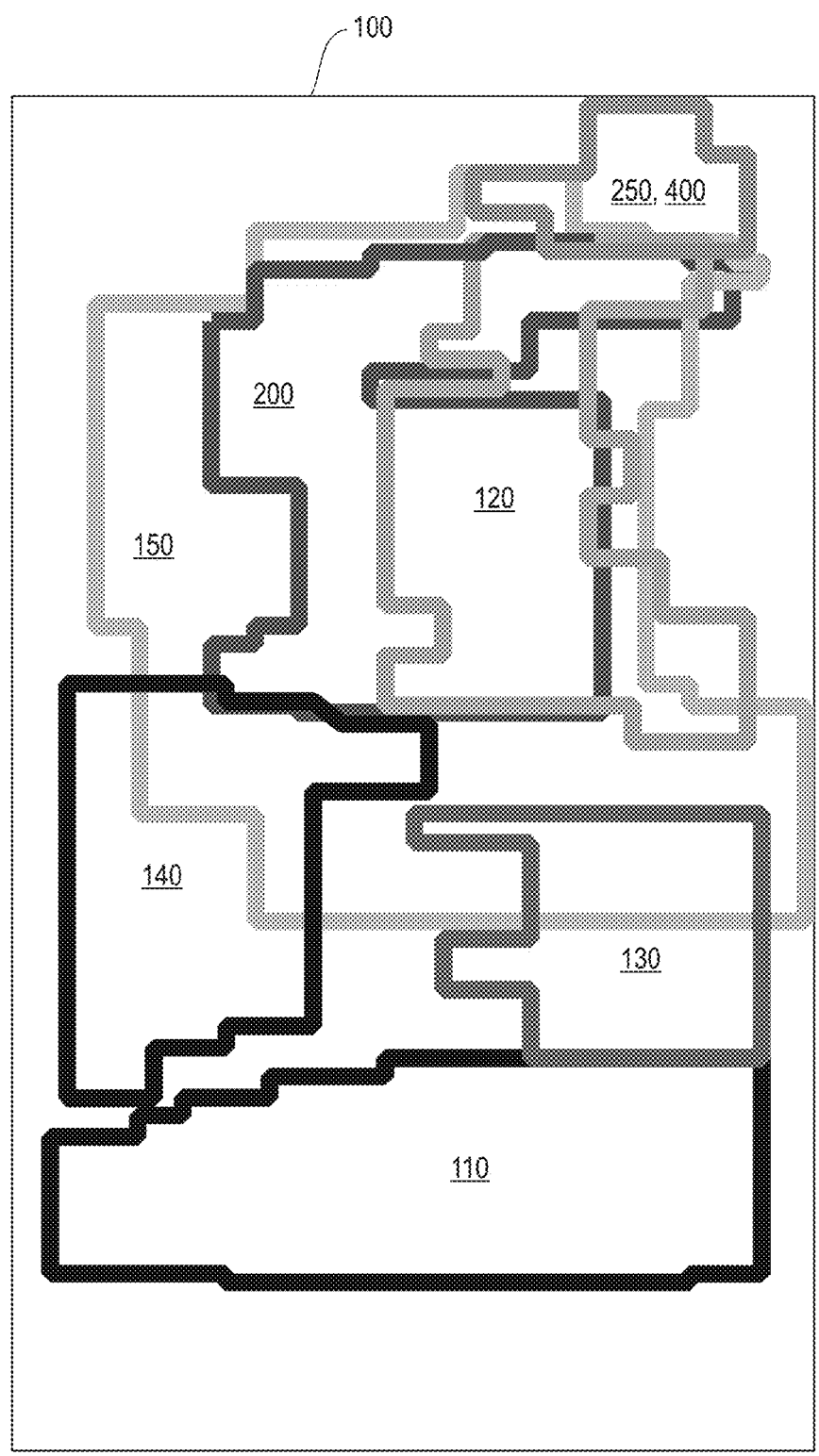
FIG. 6 illustrates an example layout of a computational logic circuit on a neurosynaptic core circuit, in accordance with an embodiment of the invention.

FIG. 6 illustrates an example layout of a computational logic circuit 100 on a neurosynaptic core circuit 650, in accordance with an embodiment of the invention. FIG. 6 illustrates approximate locations for the PRNG unit 110, the comparator unit 120, the reset unit 130, the event transmitter unit 140, the integrator unit 150, the threshold unit 200, the synaptic unit 250, and the leak unit 400. In one embodiment, some units of the logic circuit 100 overlap.

Figure 7:
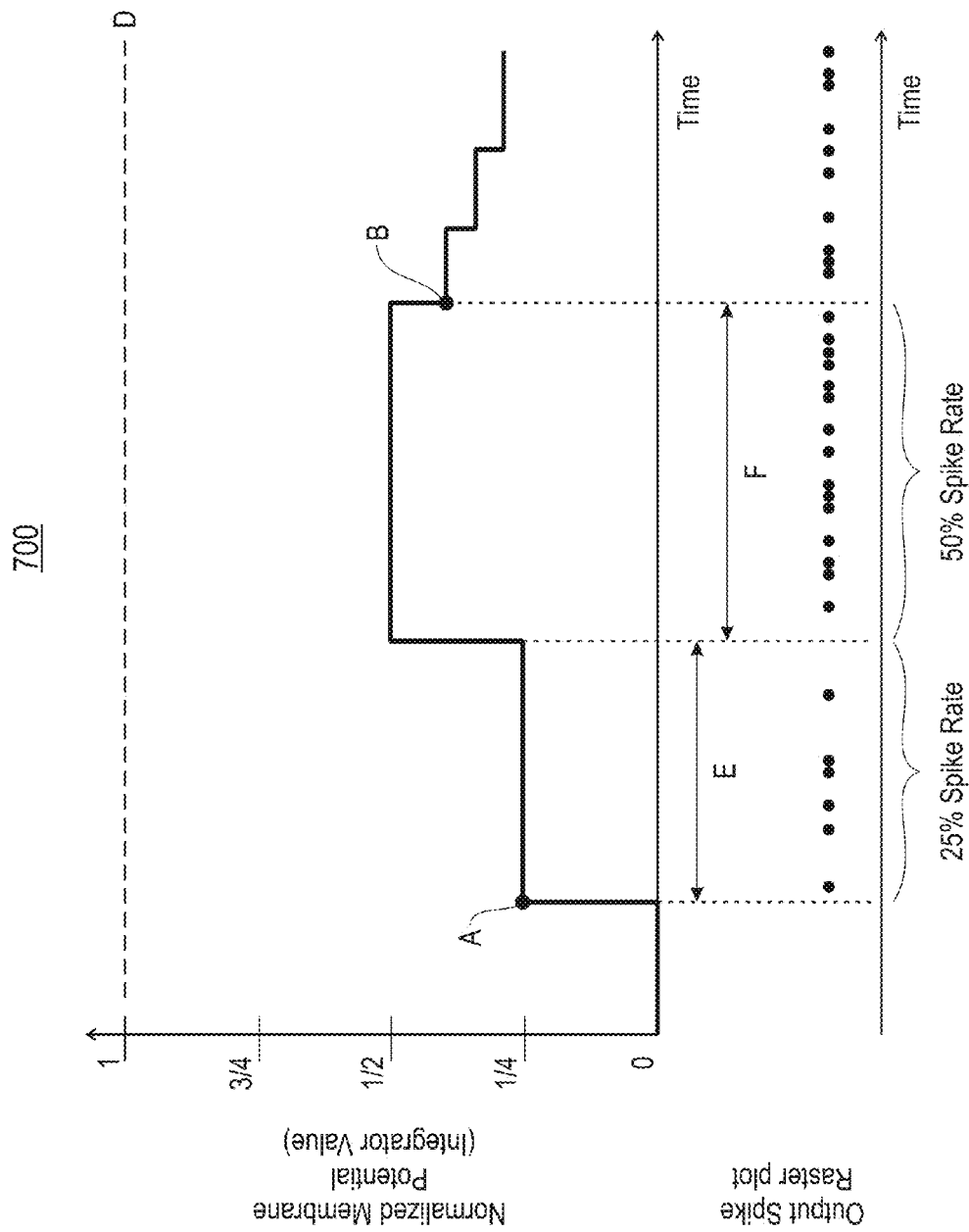
FIG. 7 illustrates an example graph illustrating a membrane potential variable over time of a stochastic neuron configured as a "rate-store" neuron type using non-reset mode, in accordance with an embodiment of the invention.

FIG. 7 illustrates an example graph 700 illustrating a membrane potential variable V over time of a stochastic neuron 11 configured as a "rate-store" neuron type using non-reset mode, in accordance with an embodiment of the invention. The neuron 11 is configured with a non-zero stochastic threshold value $Th_{STOCH}$. The neuron 11 is further configured such that the membrane potential variable V of the neuron 11 remains the same when the neuron 11 spikes (i.e., the membrane potential variable V is not reset to a reset membrane potential variable $V_{RESET}$).

Point A of the graph 700 indicates the membrane potential variable V of the neuron 11 increasing after positive synaptic input has been integrated into the membrane potential variable V. Point B of the graph 700 indicates the membrane potential variable V of the neuron 11 decreasing after negative synaptic input has been integrated into the membrane potential variable V.

When stochastic values are used (e.g., stochastic synaptic weight values $W_{STOCH}$, stochastic leak weight values $Lk_{STOCH}$, and/or stochastic threshold values $Th_{STOCH}$), the neuron 11 spikes/fires at an average firing rate proportional to a relative magnitude of the membrane potential variable V of the neuron 11.

Figure 8:
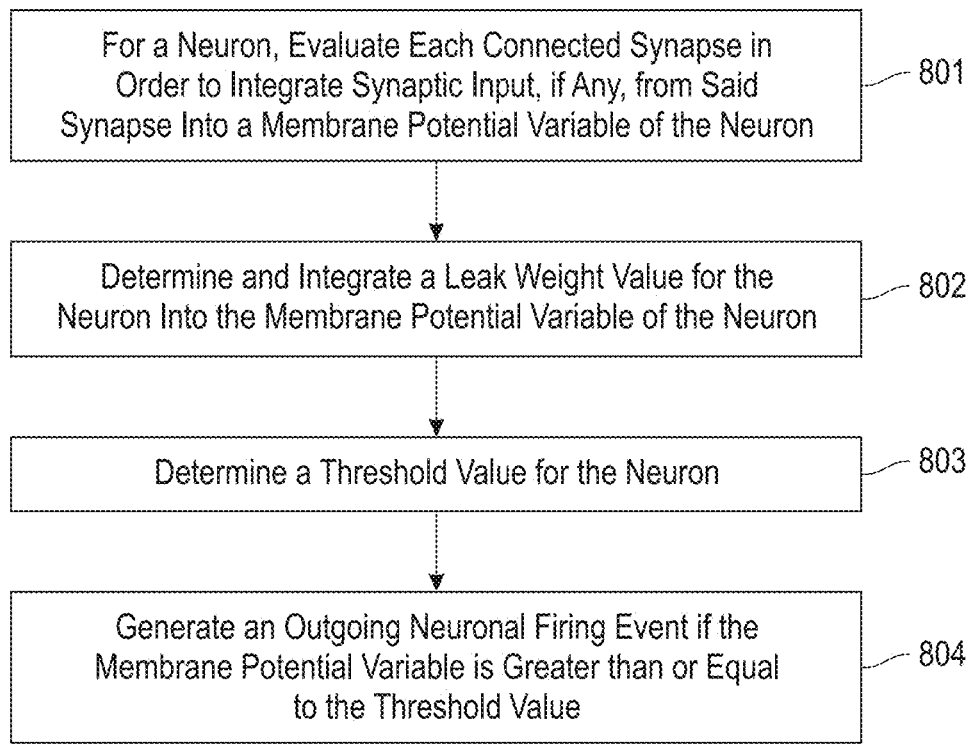
FIG. 8 illustrates a flowchart of an example process for processing incoming neuronal firing events in a dual stochastic and deterministic neuron, in accordance with an embodiment of the invention.

As shown in FIG. 7, the neuron 11 spikes stochastically in proportion to the membrane potential variable V of the neuron 11 when the membrane potential variable V is non-zero and in the range between 0 and a ceiling value D. The ceiling value D is set by a pseudo-random mask value used in determining the threshold value Th for the neuron 11. For example, period E indicates that the neuron 11 spiked 25% of the time when the membrane potential variable V is ¼ in the range between 0 and the ceiling value D. As another example, period F indicates that the neuron 11 spiked 50% of the time when the membrane potential variable V is ½ in the range between 0 and the ceiling value D FIG. 8 illustrates a flowchart of an example process 800 for processing incoming neuronal firing events in a dual stochastic and deterministic neuron, in accordance with an embodiment of the invention. In process block 801, evaluate each connected synapse in order to integrate synaptic input, if any, from said synapse into a membrane potential variable of the neuron. In process block 802, determine and integrate a leak weight value for the neuron into the membrane potential variable of the neuron. In process block 803, determine a threshold value for the neuron. In process block 804, generate an outgoing neuronal firing event if the membrane potential variable is greater than or equal to the threshold value.

Figure 9:
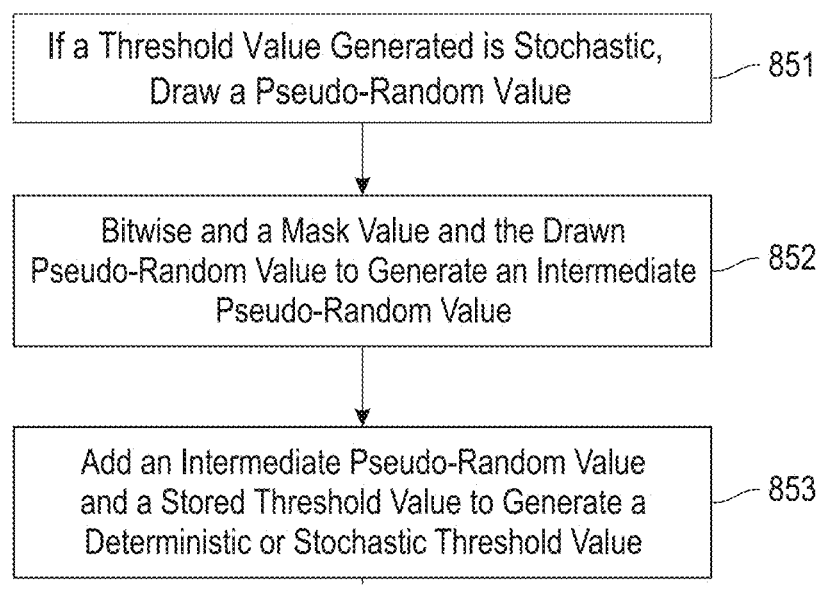
FIG. 9 illustrates a flowchart of an example process for generating a threshold value for a dual stochastic and deterministic neuron, in accordance with an embodiment of the invention.

FIG. 9 illustrates a flowchart of an example process 850 for generating a threshold value for a dual stochastic and deterministic neuron, in accordance with an embodiment of the invention. In process block 851, draw a pseudo-random value if a threshold value generated is stochastic. In process block 852, bitwise AND a mask value and the drawn pseudo-random value to generate an intermediate pseudo-random value. In process block 853, add the intermediate pseudo-random value and a stored threshold value to generate a deterministic or stochastic threshold value.

Figure 10:
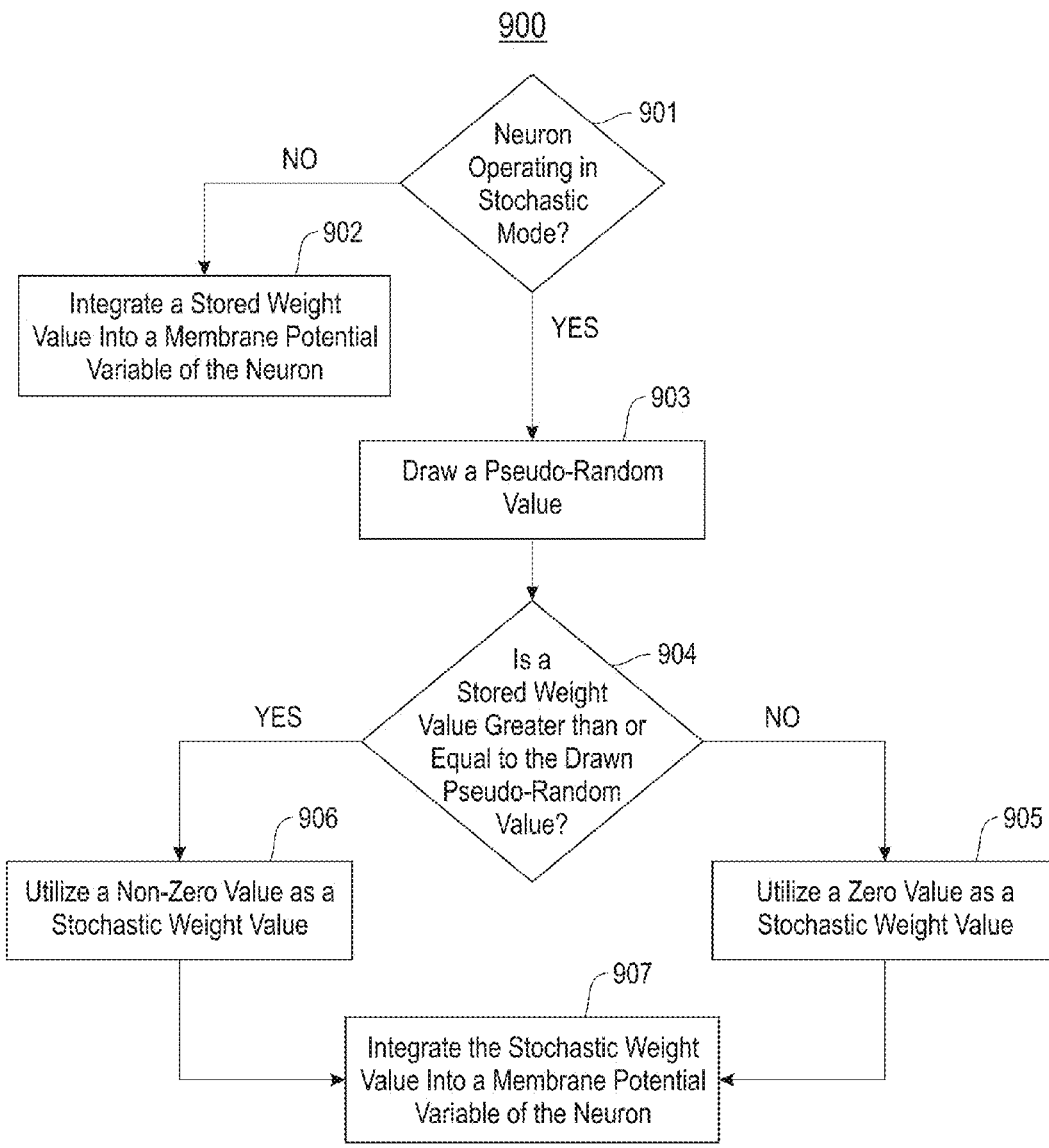
FIG. 10 illustrates a flowchart of an example process for integrating a leak/synaptic weight value in a dual stochastic and deterministic neuron, in accordance with an embodiment of the invention.

FIG. 10 illustrates a flowchart of an example process 900 for integrating a leak/synaptic weight value in a dual stochastic and deterministic neuron, in accordance with an embodiment of the invention. In process block 901, determine if the neuron is operating in stochastic mode. If the neuron is operating in deterministic mode (i.e., not stochastic mode), proceed to process block 902 where a stored leak/synaptic weight value for the neuron is integrated into a membrane potential variable of the neuron.

If the neuron is operating in stochastic mode, proceed to process block 903 where a pseudo-random value is drawn. In process block 904, determine if a stored leak/synaptic weight value for the neuron is greater than or equal to the drawn pseudo-random value. If the stored leak/synaptic weight value is greater than or equal to the drawn pseudo-random value, proceed to process block 906 where a non-zero value is utilized as a stochastic leak/synaptic weight value. If the stored leak/synaptic weight value is less than the drawn pseudo-random value, proceed to process block 905 where a zero value is utilized as a stochastic leak/synaptic weight value. In process block 907, the stochastic leak/synaptic weight value is integrated into the membrane potential variable of the neuron.

Figure 11:
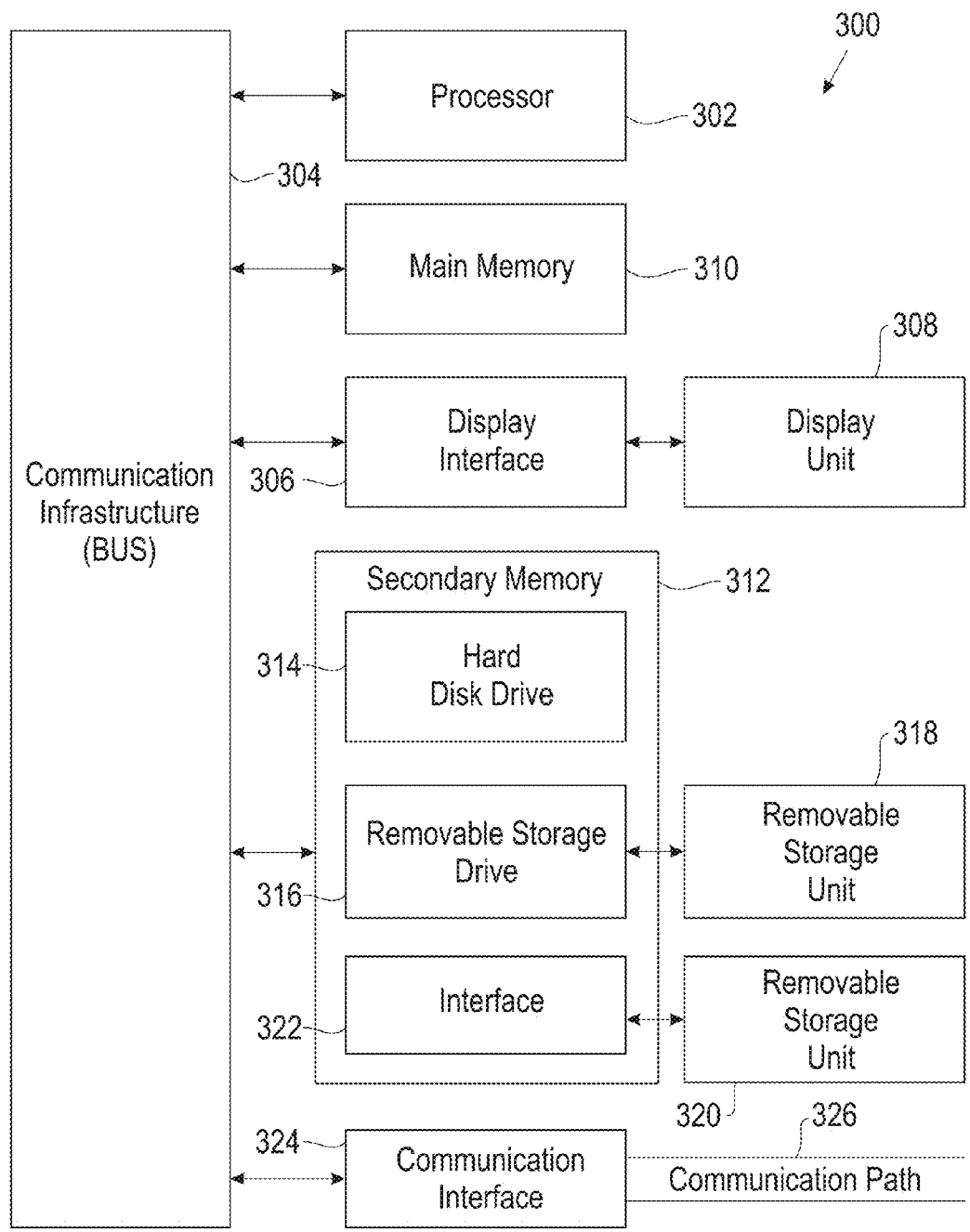
FIG. 11 is a high-level block diagram showing an information processing system useful for implementing one embodiment of the invention.

FIG. 11 is a high-level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method comprising:
maintaining, in a memory device, deterministic neural data for an electronic neuron of a neurosynaptic core circuit;
receiving an incoming neuronal firing event targeting the neuron;
generating, at a logic circuit, stochastic neural data by:
obtaining a pseudo-random value;
determining whether the deterministic neural data is less than the pseudo-random value; and
forwarding a data value selected from multiple data values as the stochastic neural data based on whether the deterministic neural data is less than the pseudo-random value, wherein the selected data value comprises a first data value in response to determining the deterministic neural data is less than the pseudo-random value, and the selected data value comprises a second data value different from the first data value in response to determining the deterministic neural data is greater than or equal to the pseudo-random value;
updating a membrane potential variable of the neuron based on the stochastic neural data; and
generating an outgoing neuronal firing event in response to the neuron spiking, wherein the stochastic neural data controls frequency of the neuron spiking, such that the neuron spikes at an average firing rate proportional to a relative magnitude of the membrane potential variable.

2. The method of claim 1, further comprising:
in response to the neuron spiking, re-setting the membrane potential variable to one of the following values: a zero value, a stored reset value, a computed reset value based on a threshold value, or a non-reset value.

3. The method of claim 1, wherein the stochastic neural data comprises at least one of a stochastic leak weight for the neuron, a stochastic synaptic weight, or a stochastic threshold value for the membrane potential variable.

4. The method of claim 1, wherein the neuron spikes in response to the membrane potential variable meeting or exceeding a threshold value for the membrane potential variable.

5. A system comprising a computer processor, a computer-readable hardware storage medium, and program code embodied with the computer-readable hardware storage medium for execution by the computer processor to implement a method comprising:
maintaining, in a memory device, deterministic neural data for an electronic neuron of a neurosynaptic core circuit;
receiving an incoming neuronal firing event targeting the neuron;
generating, at a logic circuit, stochastic neural data by:
obtaining a pseudo-random value;
determining whether the deterministic neural data is less than the pseudo-random value; and
forwarding a data value selected from multiple data values as the stochastic neural data based on whether the deterministic neural data is less than the pseudo-random value, wherein the selected data value comprises a first data value in response to determining the deterministic neural data is less than the pseudo-random value, and the selected data value comprises a second data value different from the first data value in response to determining the deterministic neural data is greater than or equal to the pseudo-random value;
updating a membrane potential variable of the neuron based on the stochastic neural data; and
generating an outgoing neuronal firing event in response to the neuron spiking, wherein the stochastic neural data controls frequency of the neuron spiking, such that the neuron spikes at an average firing rate proportional to a relative magnitude of the membrane potential variable.

6. The system of claim 5, further comprising:
in response to the neuron spiking, re-setting the membrane potential variable to one of the following values: a zero value, a stored reset value, a computed reset value based on a threshold value, or a non-reset value.

7. The system of claim 5, wherein the stochastic neural data comprises at least one of a stochastic leak weight for the neuron, a stochastic synaptic weight, or a stochastic threshold value for the membrane potential variable.

8. The system of claim 5, wherein the neuron spikes in response to the membrane potential variable meeting or exceeding a threshold value for the membrane potential variable.

9. A computer program product comprising a computer-readable hardware storage device having program code embodied therewith, the program code being executable by a computer to implement a method comprising:
maintaining, in a memory device, deterministic neural data for an electronic neuron of a neurosynaptic core circuit;
receiving an incoming neuronal firing event targeting the neuron;
generating, at a logic circuit, stochastic neural data by:
obtaining a pseudo-random value;
determining whether the deterministic neural data is less than the pseudo-random value; and
forwarding a data value selected from multiple data values as the stochastic neural data based on whether the deterministic neural data is less than the pseudo-random value, wherein the selected data value comprises a first data value in response to determining the deterministic neural data is less than the pseudo-random value, and the selected data value comprises a second data value different from the first data value in response to determining the deterministic neural data is greater than or equal to the pseudo-random value;
updating a membrane potential variable of the neuron based on the stochastic neural data; and
generating an outgoing neuronal firing event in response to the neuron spiking, wherein the stochastic neural data controls frequency of the neuron spiking, such that the neuron spikes at an average firing rate proportional to a relative magnitude of the membrane potential variable.

10. The computer program product of claim 9, further comprising:
in response to the neuron spiking, re-setting the membrane potential variable to one of the following values: a zero value, a stored reset value, a computed reset value based on a threshold value, or a non-reset value.

11. The computer program product of claim 9, wherein the stochastic neural data comprises at least one of a stochastic leak weight for the neuron, a stochastic synaptic weight, or a stochastic threshold value for the membrane potential variable.

12. The computer program product of claim 9, wherein the neuron spikes in response to the membrane potential variable meeting or exceeding a threshold value for the membrane potential variable.

13. The method of claim 1, wherein the first data value comprises a zero value, and the second data value comprises a non-zero value.

14. The method of claim 13, wherein the non-zero value is one of a positive integer or a negative integer.

* * * * *